US007176893B1

(12) United States Patent
Larkin

(10) Patent No.: US 7,176,893 B1
(45) Date of Patent: Feb. 13, 2007

(54) FORWARD TRACKING ARC BASED FIRST PERSON PISTOL GRIP GAME CONTROL

(76) Inventor: Edward F. Larkin, 32 Turtle Run Rd., Winthrop, ME (US) 04364

( * ) Notice: Subject to any disclaimer, the term of this patent is extended or adjusted under 35 U.S.C. 154(b) by 495 days.

(21) Appl. No.: 10/794,455

(22) Filed: Mar. 6, 2004

(51) Int. Cl.
G09G 5/08 (2006.01)

(52) U.S. Cl. .................. 345/161; 345/163; 345/167; 348/734; 463/37; 463/38; 463/47

(58) Field of Classification Search ........ 345/156–167; 463/36–38, 47; 348/734; D26/109
See application file for complete search history.

(56) References Cited

U.S. PATENT DOCUMENTS

D352,331 S * 11/1994 Wu .................. D14/416
6,287,198 B1 * 9/2001 McCauley .................. 463/37
6,310,606 B1 * 10/2001 Armstrong .................. 345/161
6,535,198 B1 * 3/2003 Fan ........................ 345/158
6,565,438 B2 * 5/2003 Ogino .................... 463/37
2003/0184519 A1 * 10/2003 Liu .................... 345/163

* cited by examiner

Primary Examiner—Henry N. Tran

(57) ABSTRACT

A manually moveable FPS control unit for moving a cursor on a console display screen, which unit has a forward end housing an optical sensor adapted for selective positioning in front of an axis of rotation at a rearward location. Rotation about the rearward axis creates arc movements of the optical sensor, and these arc paths are translated into horizontal cursor movements on a display screen. A manually controlled pistol-shaped-grip provides rotation of the unit about the rear vertically-located axis. Roller wheel and other conventional control switches are mounted on the grip handle itself for natural and quick control over images displayed on the screen.

20 Claims, 3 Drawing Sheets

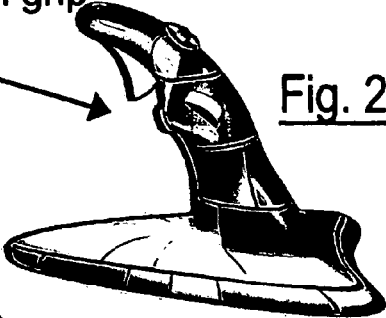
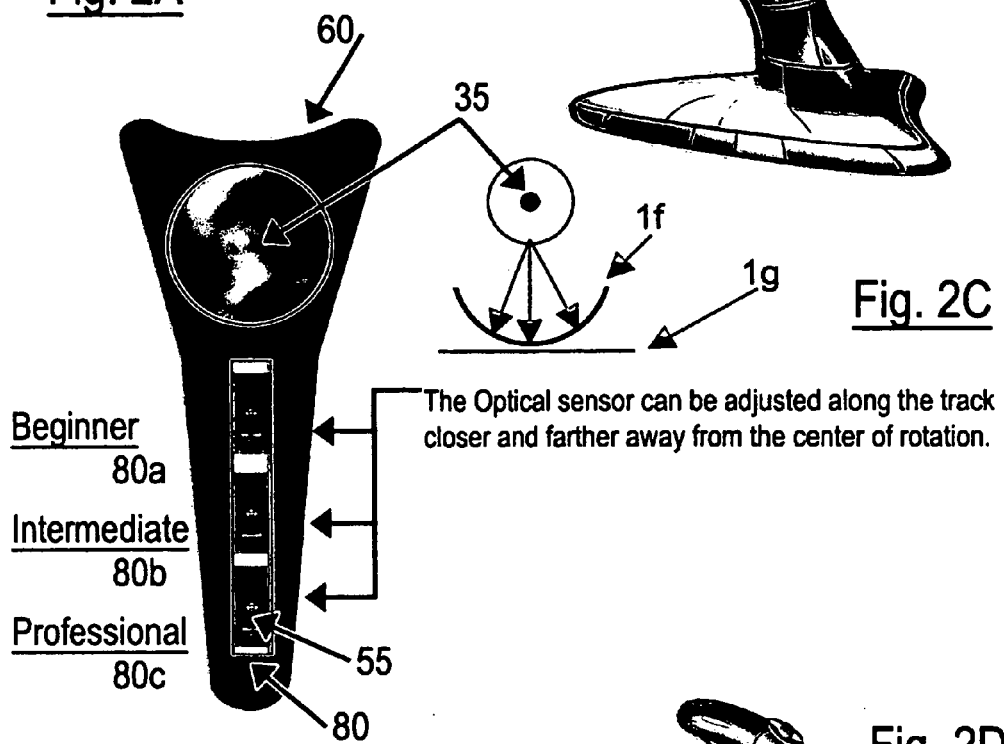
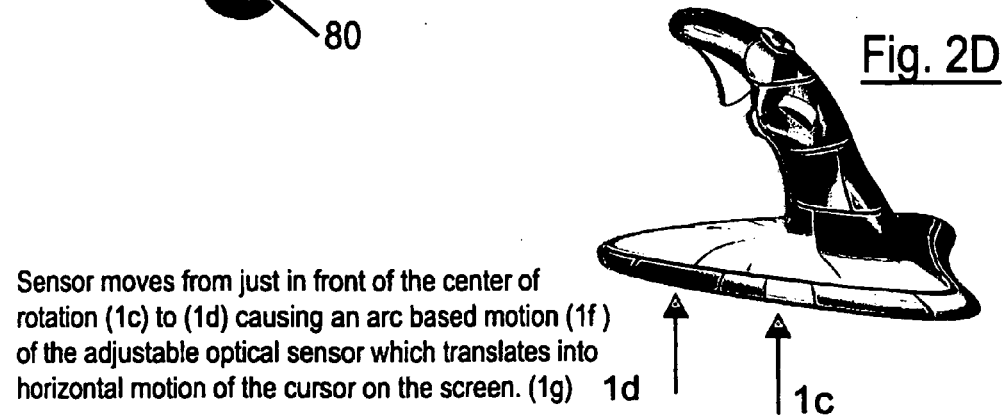
First Person Shooter Fig 2

FORWARD TRACKING ARC BASED FIRST PERSON PISTOL GRIP GAME CONTROL

FIELD OF THE INVENTION

The field of the present invention relates to display screens which include a manual game controller for same. Further, the field of this game control invention relates to a forward tracking pistol grip first person shooter ("FPS") control that provides improved speed, accuracy and realistic pointing and firing to control cursor movement on the screen.

Further, the field of this invention relates to an optical game controller for computer screen uses. Additionally, this invention relates to the field of ergonomics for improved manual control devices that do not require extensive or crippling arm/wrist movements for manually achieving improved cursor control on computer screens and similar devices.

EXPLANATION OF TERMS

My invention interfaces and operates in conjunction with display screens as found primarily on computer consoles and game display devices. Provided below are brief descriptions of certain relevant terms which further the understanding of the invention, and provide a basis for a detailed teaching of the improvement in the art provided by this invention.

Pistol Grip First Person Shooter ("FPS") Control.

Computer and game display screens include a visual pointer (cursor) for user orientation purposes. High speed game playing requires a player to visually interact with the game display being presented on the screen. In the so-called "first person" situation, the opponent depicted on the screen is viewed from a normal real-life perspective as though the player using the controller is actually in the display and sees the opponent from the controller's own—first person—eyes. Generally, the objective of the game is to shoot your opponent before he, she, or it shoots you—thus, requiring high levels of skill, accuracy, speed and fast reaction time often over extended playing periods. Control of the visual pointer on such a screen is achieved by user-initiated pointing and aiming of my pistol grip controller which includes a trigger in order to provide a firing sensation by a very natural (anti-carpal tunnel) wrist movement. Current plans call for the "first person" to also ride in vehicles such as simulated aircraft thus increasing the need for more sophisticated control devices.

Center of Rotation.

My first person shooter has an elongated base with a front and rear end. The pistol grip base has an optical scanner of the same type as used in optical mice. Placing the sensor forward of the pistol grip causes horizontal tracking to occur by rotating the pistol grip. This rotation creates an arc based motion for quick left right shooting movements. The butt end of my pistol grip is affixed at the rear end of the base with the trigger area facing forward where the trigger and raised front end of my controller both simulate sighting and firing of the screen's cursor. The center of rotation for my controller is around a vertical axis that is positioned toward the rear. An adjustable optical sensor lies in a front to back plane which includes this center of rotation. Aiming from right to left involves pointing by a rotating movement of the base, which results in an arc based motion for the optical sensor. That arc based motion is translated to a corresponding horizontal cursor movement on the screen.

Optical Sensor Elements.

An optical sensor is located at the front of my controller base. The function of that optical sensor is to translate the optical sensors arc path/motion/movement into a horizontal movement of the cursor on the display screen. Speed of cursor movement is controlled by the selective positioning of my adjustable forwardly located optical sensor. In my FPS, the position of the optical sensor is adjustable in order to conform to the speed and playing characteristics of a particular player. For the same given rotational movement of my grip, the professional sensor position will be several times faster and wider than when in the beginner position. Dramatic speed variations are provided by selective positioning of the forward sensor location.

Control Buttons.

One, two or more buttons (or button/trigger switches) are commonly employed in game controllers. Such devices are housed in my FPS control in an ergonomic forward tracking pistol grip location for activation in a manner that is both natural and avoids unnecessary hand/wrist movement. Such unnecessary movement, commonly associated with the prior art, delays user response time and contributes to carpal tunnel ailments. Depressing/rotating a roller wheel, programmable 4-way or similar type button, toggles certain micro switches as necessary for menu selection and various game control operations. (Some of the more advanced FPS games now have a first person player actually in flying vehicles and the 4-way programmable switch and wheel roller together offer significant maneuverability advantages.)

BACKGROUND OF THE INVENTION

The computer games of today are the rage, and such games require extreme speed in up-down, left-right and diagonal cursor movements on a computer screen. Since the computer user is actually playing a game against high speed computer software or opponents online, the pointer on the computer screen must be manually moved with skillful eye-to-hand coordination in order for a user/player to "win". Thus, computer game playing demands precise control, skill, swift and accurate movement and timely and positive depression of control buttons on a manually moveable pointer control. Attempts to use mouse configurations for FPS game playing have not proved successful.

In a related application entitled Finger Tip Pointer Control, Ser. No. 09/955,252—now abandoned—finger tip control was described as achieving desired health improvements by reducing unnatural wrist-like movements experienced by standard center wheel mouse structures. Even less unnatural movements are now described and claimed herein by my FPS game playing structure. The cited art of that application is not considered pertinent to this invention but its presence should be noted.

Some health risks associated with mouse and computer use include Carpal Tunnel Syndrome ("CTS"), sometimes referred to as Repetitive Motion Injury ("RMI"). CTS/RMI results from pressure developed on the median nerve, which nerve is located in the wrist's "carpal tunnel" formed by carpal bones and a transverse carpal ligament. Such pressure may cause swelling and ultimately pinched and painful throbbing, tingling or numbness in the hand and fingers.

Some users actually lift the mouse itself and this lifting, together with sliding and/or rotation of the mouse inevitably results in hasty, erratic and jerky cursor movement. Excessive hand and arm activity uses up time and energy that could be more beneficially spent in a FPS game playing situation. My FPS achieves such speed and accuracy and eliminates many of the unnatural movements associated with CTS/RMI.

A conventional mouse has a central wheel and a plurality of forwardly-located switches. More recently, even a wireless mouse has been announced, which mouse includes batteries and radio transmission of signals representative of the switching and tracking functions between control and computer. In such prior art, switches are normally located on the right and left hand sides of a middle wheel. Both rubber ball and/or optical sensors are available although only one or the other—not both—are normally used.

Optical sensors of the type employed in my FPS may be of any known types such as that marketed by Agilent and as fully described in a series of technical papers available on the Internet under the Agilent menu for Optical Devices. The titles of such Agilent papers include: Solid-State Optical Mouse Sensor with PS/2 and Quadrature Outputs, Solid State Optical Mouse LED Assembly Clip, Radiometrically Tested AlInGaP II LED Lamps for Sensor-Based Applications, Solid-State Optical Mouse Sensor and Solid-State Optical Mouse Lens. These technical papers fully describe the operation of such an optical sensor and need not be repeated here. Such papers, by this reference, are incorporated herein as though set forth in full.

DESCRIPTION OF PRIOR ART

The cursor controller device of this invention has been designed to be used as a cursor controller for video games (computer and consoles such as Xbox/Nintendo etc.) that are specifically of the forward tracking first person shooter (FPS) genre. Somewhat reminiscent of the "Old West Gun Duel", the objective is to beat the visually presented opponent to the draw while aiming and firing at your opponent with precision. Introduction of the FPS actually occupying a flying vehicle or jet plane on the screen have significantly increased the left, right, roll, pitch, yaw, up, and down commands that must be quickly achievable by a FPS controller.

In related art, flying games have joystick controllers to simulate flying control movement by the user, and racing car games have steering wheels for the driver of racing games. But first person shooter controllers—prior to this invention—were primarily achieved by using a computer mouse which is manipulated about on a surface. This mouse is not ideally suited for FPS but was the only option available. Indeed, this FPS device of this invention is the first serious attempt to deliver a gaming experience for first person shooters by structure that heretofore was not known nor recognized.

One key element of my device is to provide a specially designed device that. like joy sticks and steering wheels delivers the added and realistic sensation of firing a trigger when shooting during a FPS game, rather than pressing a button on a mouse to0 shoot.

Although steering wheels and joy sticks are acceptable for their particular games, they are not at all natural nor are they considered adequate for high speed FPS game playing. Simply stated, joy sticks do not provide the range of movement/motion or speed needed for FPS gaming. The joy stick, although having a form of pistol grip handle, is set above—and is rigidly connected to—a fixed base. A joy stick base is not moveable and this fact alone eliminates it as serious consideration for FPS game situations.

The joy stick base includes sensors and other electronic components, such as gimble joints, that are mounted in the fixed base location. The joy stick electronics and physical parameters provide only limited range sensors for x y cursor positioning. Moreover the joy stick when moved to its limit position keeps commanding the computer's software to move more and more thus interrupting and delaying play from a FPS standpoint. Incremental joy stick movements are considered inadequate for FPS game playing.

The advantages and inventive nature of my method and apparatus over the aforementioned prior art are significant. First, a user can more efficiently and accurately control cursor movement by a forwardly located optical tracking sensor in conjunction with an ergonomically-shaped rearward located pistol grip. Improved pointer control is achieved by a rearward mounted pistol grip handle having an axis of rotation located towards the rear of the control base, together with selectively adjustable optical sensor positioning. Switching controls are physically positioned at the top area of the grip where they are naturally and quickly available to the FPS player.

SUMMARY OF THE INVENTION

My apparatus and method physically relocates switching and tracking functions and provides natural control manipulations of a pointer. A manually moveable control unit, having a forward and a rear end section with a vertical axis at the rear end for moving a pointer in x and y directions on a console display screen, includes an optical movement tracking sensor mounted in the forward end of said unit. The FPS generates tracking signals representative of rotational movements imparted to said unit by a user. The user/player rotates the rear end of said control unit about the vertical axis for right-left control of said pointer. In the FPS a small swivel or slight rotation about that axis is easily and naturally achieved via a substantially pistol-grip-shape defining the location of the axis of rotation.

A forward tracking first person shooter with a forwardly located optical sensor is believed to be new and novel. The positioning for my forward optical sensor is adjustable—to and fro—along a plane lying through the axis of rotation as a selective speed control over cursor movement.

The pointer control of this invention, in short summary, has moved a prior art tracking function—normally located at the middle or with a fixed base—to the extreme forward end of a novel FPS cursor control for video game computer playing. Switching, while still provided by standard elements such as wheels or buttons, is incorporated at naturally comfortable positions on the grip itself.

In the prior art, mouse twisting or mouse rotation—due to the prior art center tracking location—did nothing other than cause erratic screen activity without achieving any worthwhile result. My pointer control with its forward tracking function via an optical sensor in conjunction with an axis of rotation at the pistol grip rear end, provides quick and accurate cursor control unlike any known prior art whether of the mouse or joy stick type. Additionally, my FPS controller eliminates excessive wrist, hand and arm movement.

OBJECTS OF THE INVENTION

It is an object to provide a FPS control for a computer screen that has a tracking function in the form of an optical tracking sensor located at the forward end of a manually moveable controller base.

It is another object to provide for right-to-left screen cursor control by a manually moveable control device of a novel shape that provides pistol grip control at the rear of the control base.

It is a further object to provide improved speed, accuracy and sensitivity without excessive arm, wrist and hand movement tending toward CTS/RMI injuries that characterize the mouse-type prior art.

It is yet one other object to provide the natural wrist positioning of a joy stick controller for FPS game playing by arc movements about a rearward-located center of rotation.

It is a further object to develop a new dimension arc movement about a center of rotation, which arc movement is translated to horizontal cursor movement.

It is still one additional object to provide selective adjustment of a forward adjustable-position sensor in a track along the controller base on order to control speed of cursor movement on the display screen.

It is a final object of my invention to provide several control buttons mounted on a handle that leaves the wrist in a natural position yet allow a series of buttons to be controlled by the thumb of the player/user

BRIEF DESCRIPTION OF THE DRAWING

FIG. 2 includes is the bottom side of the base of FIG. 1 and includes FIGS. 2A, 2B, 2C, and 2D useful in describing multiple sensor positions in accordance with the principles of my invention;

DESCRIPTION OF EMBODIMENT(S)

Figures 1, 4:
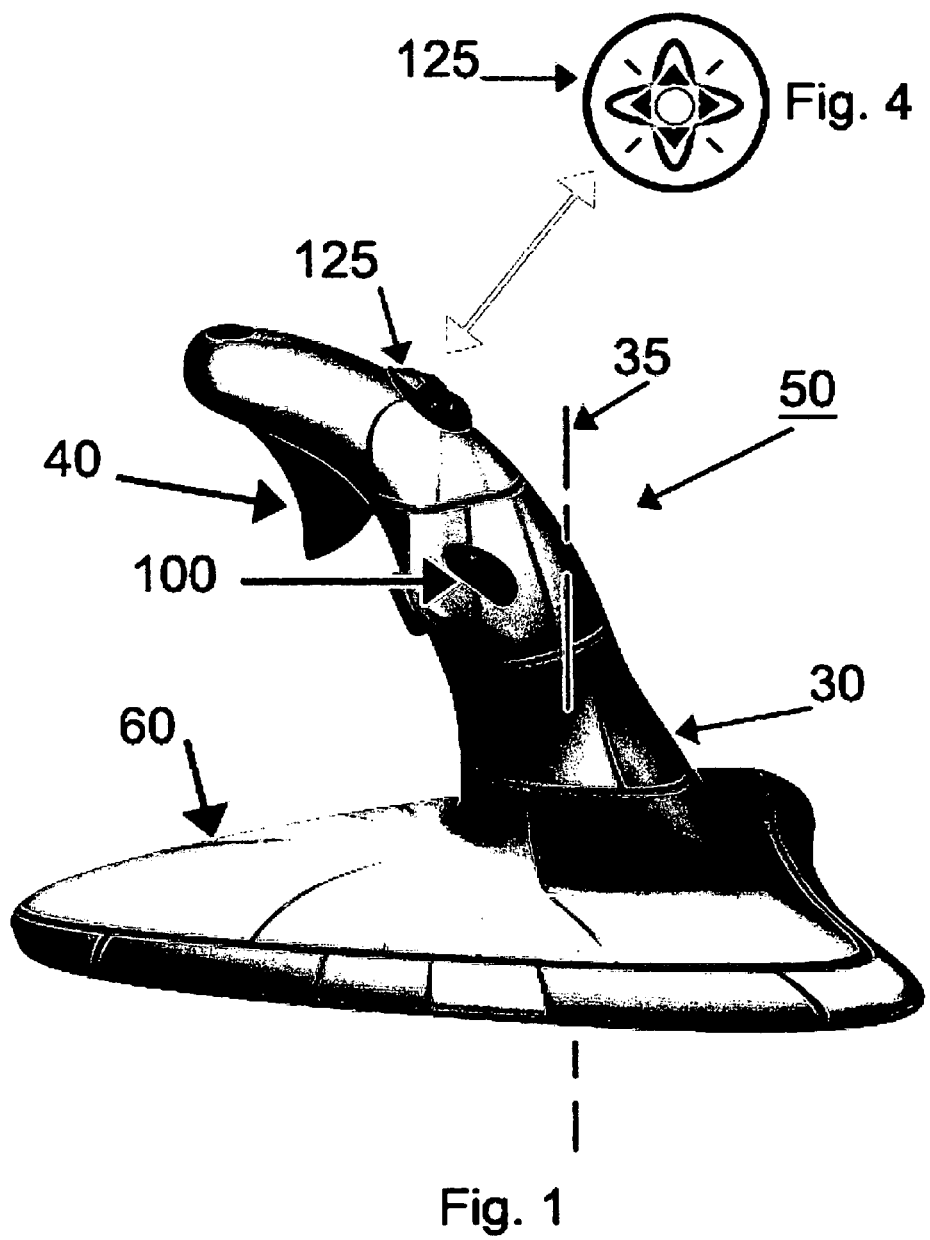
FIG. 1 is a perspective view of my FPS controller in accordance with this invention.
FIG. 4 is a top view of a programmable four direction switch for player control over flying functions in some FPS games.

FIG. 1 is a perspective view of my FPS controller 50 in accordance with this invention. In FIG. 1 trigger 40, is located at the upper forward end of a pistol-type grip 30. Grip 30 provides an axis of rotation 35 as defined and as shown, for example, in more detail in FIG. 2A.

FIG. 2 repeats, in smaller size, the device 50 of FIG. 1 and is believed to be helpful in describing the operation of my invention. FIG. 2A is the underside of base 60 of my FPS 30 and shows the vertical axis of rotation as a dot 35. In this FIG. 2A an optical sensor 55 is located toward the extreme front end of the base 60 for controller 50. (Although three separate sensors are depicted, only one sensor is actually used. The triplicate view simply indicates separate positions achieved via the adjustability of sensor 55 of my FPS 30.) This positioning of my optical sensor 55—forward and spaced slightly in front of the rearward grip 30—is a key principle of my new and novel FPS controller invention.

FIG. 2 includes FIG. 2A which is an underside view of my base 60. FIG. 2A shows a track 80 and three selectively separate positions for sensor 55. The sensor 55 may be fixed along track 80 in any conventional manner such as, for example, dropping into a pre-positioned detent molded in the track 80. As indicated by the written legends, these three positions relate to cursor speed, and thus represent the varying capabilities of FPS players. While my invention should not be taken as limited to only three selected positions for sensor 55, it is believed that three such positions adequately define the development levels of most FPS players.

Figure 3:
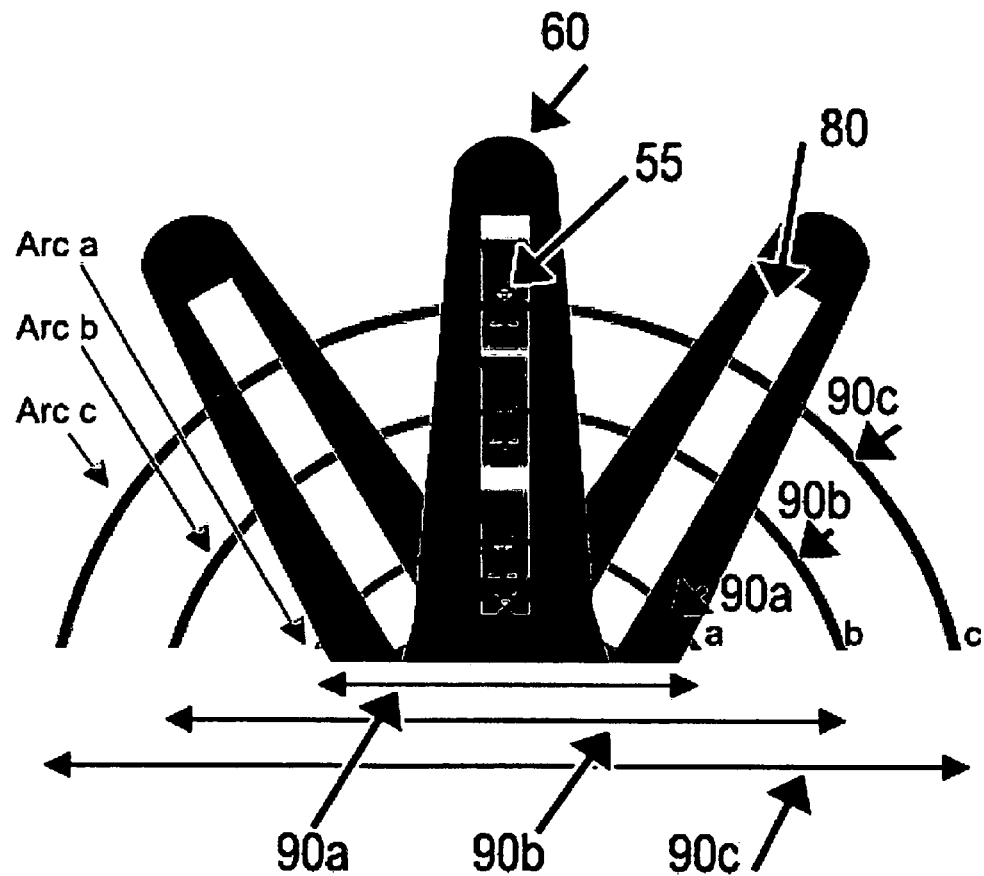
FIG. 3 is a view showing the manner in which an arc movement about my axis of rotation is related to cursor speed on a display screen as achieved by my selectively adjustable track positioning of my forward located optical sensor.

Beginners position 80a functions with a shorter arc—namely arc 1f of FIG. 2C. At this shorter arc position the translated horizontal cursor movement is slower and shorter than it is in the other positions. FIG. 3 is a depiction of the effect of moving the sensor 55 along an arc path 90a for the beginner position 80a. I believe that it is little known that an arc movement of an optical sensor 55 along an elliptical/arc based path actually produces a corresponding horizontal cursor movement on a display screen.

Indeed, one would perhaps expect that moving the sensor in an arc path would create a corresponding arc path movement on the display screen. Instead we get—for an arc movement along path 90a—an almost perfectly straight line horizontal movement on the display screen. FIG. 3 depicts similar results for longer arcs 90b and 90c and wider horizontal sweeps 90a and 90b.

It is the special spatial translational characteristic of my optical sensor response that so admirably suits complex FPS demands. Forward tracking in front of an axis of rotation at a pistol grip achieves novel results in a way not heretofore thought possible.

FIG. 3 is believed to be self explanatory based upon the legends provided thereat. Please understand that when the sensor 55 is in a "Professional" position as compared to the base, or "Beginner" position, that the same amount of rotational movement at my grip yields up to five (5) times the distance that the cursor moves. Since speed is directly related to the amount of horizontal movement, the Professional player using my FPS invention will aim and shoot—up to 5 times or more—faster than the beginner.

A middle sensor position 80b equates with a more advanced player while the extreme forward position 80c equates with a professional player for FPS games. Each progressive player grade is directly related to the radius of the arc. Thus, an increased arc is achieved when sensor 55 is moved further away from the center of rotation.

In accordance with my invention, control 50 may be of a molded one piece construction from material such as plastic or a similar material with inner cavities as necessary to house the wheel, micro switches and the like. Likewise an optical sensor 55 may be housed in a track located at the extreme forward end of the control 50. Although not limiting, the base 60 may be in the order of about four to six inches long, and the sensor track itself may be about 2 to 2½ inches long.

Mounted on the top of the FPS handle is a programmable 4-way switch 110 of a type that is well known in the art. Depression of any of the quadrants closes a separate switch that may then feed signals to the computer for control over additional display screen activity. For example, one quadrant may control roll left or right of a displayed craft, whereas another quadrant may control pitch up or down of a flying craft. This switch may also be of the molded type and the associated electronics are well understood and need not be repeated here. What is significant is that when a player is not using his thumb to control the roller wheel 100, FIG. 1, that thumb may easily be employed in a very natural manner to depress appropriate quadrants of switch 110.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. A manually moveable control unit having a forward and a rear end with a vertical axis of rotation at the rear end for moving a cursor in x and y directions on a console display screen, said control unit comprising:
   an optical movement tracking sensor mounted in the forward end of said unit for generating tracking signals representative of rear end rotational movements imparted to said unit by a user; and
   manual means for user application of rotational movement of said unit about said vertical axis for right-left control of said cursor on said display screen.

2. The control unit of claim 1 having a flat moveable base and further comprising:
   said manual means comprises a pistol-shaped grip with said vertical axis of rotation passing through said grip.

3. The control unit of claim 2 and further comprising:
   a forward facing trigger mounted at the upper end of said pistol grip for activation by a user's trigger finger.

4. The control unit of claim 1 wherein rotation of a base about the vertical axis of rotation sweeps said forward-mounted tracking sensor in an arc, and further comprising:
   said optical sensor translates said arc movement to straight line horizontal movement of said cursor on said display screen.

5. The control unit of claim 1 wherein said optical sensor is position adjustable, and further comprising:
   a track formed in a base, which track runs forward from said center of rotation toward the front of said base; and
   means for securing said optical sensor at selected positions in said track.

6. The control unit of claim 1 and further comprising:
   a roller wheel mounted near the top of the grip and having a position readily accessible by the thumb of the player.

7. The control unit of claim 1 and further comprising:
   a four way quadrant switch mounted on the top of the grip for control over various motions of a display on a screen.

8. A first person shooter controller with a trigger on a forward tracking pistol grip for firing a screen's cursor when playing computer games on a visual display screen, the controller having a moveable base with a front and rear end and said controller comprising;
   a forward tracking pistol grip located at the rear end of said base and defining thereat a center of rotation for said controller;
   an optical sensor positioned in front of said center of rotation; and
   said base being both physically moveable and capable of arc based rotation for left to right aiming, which arc motion is translated by said optical sensor into horizontal cursor movement on said display screen.

9. The control unit of claim 8 wherein said optical sensor is position adjustable, and further comprising:
   a track formed in said base, which track runs forward from said forward tracking pistol grip toward the front of said base; and
   means for securing said optical sensor at selected positions in said track.

10. The control unit of claim 8 and further comprising:
    a forward facing trigger mounted at the upper end of said pistol grip for activation by a user's trigger finger.

11. The control unit of claim 8 and further comprising:
    rotation of said base sweeps said forward-mounted tracking sensor in an arc for left to right cursor movement on said screen.

12. The control unit of claim 8 and further comprising:
    a roller wheel mounted near the top of the grip and having a position readily accessible by the thumb of the player.

13. The control unit of claim 8 and further comprising:
    a four way quadrant switch mounted on the top of the grip for thumb control over various motions of a display on a screen.

14. A method of fashioning a manually moveable control unit that is in signal communication with a computer for delivering thereto signals representative of movements of said unit, which signals, in turn move a pointer on a console display screen, said method comprising the steps of;
    providing a substantially flat base with a forward end, a center of swivel movement at a rear end section of said base;
    mounting an optical movement tracking sensor in the forward end of said unit; and
    generating tracking signals representative of rotational movements imparted to said unit by a user.

15. The method of fashioning a manually moveable control unit in accordance with claim 14 and further comprising the steps of:
    placing a position-adjustable optical sensor in a track opening in said base.

16. The method of fashioning a manually moveable control unit in accordance with claim 15 and further comprising the steps wherein a user:
    free of arm movement, imparts rotation movement to said base by the holding the control unit in a natural vertical position on said grip.

17. The method of fashioning a manually moveable control unit in accordance with claim 14 and further comprising the steps of:
    sweeping said forward mounted tracking sensor in a flat arc for forming left to right pointer control signals.

18. The method of fashioning a manually moveable control unit in accordance with claim 14 and further comprising the steps of:
    mounting a depressible roller wheel on the side of said pistol grip near the top and reachable by the thumb of a user, and mounting other control switches on the top of said pistol grip, which other switches are also reachable by the thumb of said user.

19. The method in accordance with claim 18 wherein said control unit further comprises:
    switching means for controlling said displayed image in at least three or more ways by said other switches.

20. A manually moveable control unit for moving a pointer on a console display screen, said control unit comprising;
    a manually moveable substantially flat base having a forward and a rear end section;
    a pistol-like-grip to fit the hand of a user extending upward from the rear end of said unit for manual rotation of said unit about a rearward axis of rotation; and
    a selectively moveable optical tracking sensor located on said base forward of said pistol-like-grip.

* * * * *